United States Patent
Peng

(10) Patent No.: US 9,178,843 B2
(45) Date of Patent: Nov. 3, 2015

(54) METHOD FOR SENDING ELECTRONIC MAIL RECEIPT AND MOBILE TERMINAL

(71) Applicant: Huawei Device Co., LTD, Shenzhen (CN)

(72) Inventor: Jun Peng, Xi'an (CN)

(73) Assignee: Huawei Device Co. Ltd., Shenzhen (CN)

( * ) Notice: Subject to any disclaimer, the term of this patent is extended or adjusted under 35 U.S.C. 154(b) by 117 days.

(21) Appl. No.: 13/941,260

(22) Filed: Jul. 12, 2013

(65) Prior Publication Data

US 2013/0303209 A1  Nov. 14, 2013

Related U.S. Application Data

(63) Continuation of application No. PCT/CN2012/070317, filed on Jan. 13, 2012.

(30) Foreign Application Priority Data

Jan. 13, 2011 (CN) .......................... 2011 1 0006796

(51) Int. Cl.
*H04W 4/12* (2009.01)
*H04L 12/58* (2006.01)
*H04L 29/12* (2006.01)
*H04W 4/14* (2009.01)

(52) U.S. Cl.
CPC ................ *H04L 51/18* (2013.01); *H04L 51/30* (2013.01); *H04L 61/106* (2013.01); *H04L 61/307* (2013.01); *H04L 61/605* (2013.01); *H04W 4/12* (2013.01); *H04W 4/14* (2013.01); *H04L 51/38* (2013.01)

(58) Field of Classification Search
USPC ................. 455/466; 709/217, 245, 246, 288; 379/413, 220.01
See application file for complete search history.

(56) References Cited

U.S. PATENT DOCUMENTS

| | | | |
|---|---|---|---|
| 2003/0101283 A1* | 5/2003 | Lewis et al. .................... | 709/246 |
| 2003/0182380 A1 | 9/2003 | Yabe et al. | |
| 2014/0222682 A1* | 8/2014 | Dua ............................... | 705/44 |

FOREIGN PATENT DOCUMENTS

| | | |
|---|---|---|
| CA | 2566994 A1 | 5/2007 |
| CN | 1397129 A | 2/2003 |
| CN | 1645842 A | 7/2005 |

(Continued)

OTHER PUBLICATIONS

Chinese Office Action received in Application No. 201110006796.8 mailed Sep. 18, 2012, 7 pages.

(Continued)

*Primary Examiner* — Diane Mizrahi
(74) *Attorney, Agent, or Firm* — Slater & Matsil, L.L.P.

(57) ABSTRACT

Embodiments of the present invention provide a method for sending an electronic mail receipt and a mobile terminal. In the method, a first mobile terminal obtains an electronic mail sent by a second mobile terminal. A header of the electronic mail contains indication information about whether it is required to send a receipt for the electronic mail. When the first mobile terminal determines according to the indication information that it is required to send a receipt, the first mobile terminal obtains a phone number of the second mobile terminal from the electronic mail and sends a short message with preset content to the phone number of the second mobile terminal.

4 Claims, 2 Drawing Sheets

A first mobile terminal obtains an electronic mail sent by a second mobile terminal, where a header of the electronic mail contains indication information about whether it is required to send a receipt for the electronic mail — S101

When the first mobile terminal determines according to the indication information that it is required to send a receipt, the first mobile terminal obtains a phone number of the second mobile terminal, and sends a short message with preset content to the phone number of the second mobile terminal — S102

(56) References Cited

FOREIGN PATENT DOCUMENTS

| | | |
|---|---|---|
| CN | 1832606 A | 9/2006 |
| CN | 101110988 A | 1/2008 |
| CN | 101287172 A | 10/2008 |
| CN | 101442720 A | 5/2009 |
| CN | 101651852 A | 2/2010 |
| CN | 101815260 A | 8/2010 |
| CN | 102111498 A | 6/2011 |
| EP | 2648430 A1 | 10/2013 |
| GB | 2381998 A | 5/2003 |
| TW | 200713934 | 4/2007 |
| WO | 2007019482 A2 | 2/2007 |

OTHER PUBLICATIONS

Chinese Office Action received in Application No. 201110006796.8 mailed Apr. 24, 2013, 5 pages.

International Search Report received in Application No. PCT/CN2012/070317 mailed Apr. 12, 2012, 6 pages.

Email Tracking, http://en.wikipedia.org/wiki/Email_tracking, Jul. 6, 2013, 2 pages.

Extended European Search Report received in Application No. 12733939.8-1856 mailed Jan. 17, 2014, 6 pages.

* cited by examiner

METHOD FOR SENDING ELECTRONIC MAIL RECEIPT AND MOBILE TERMINAL

CROSS-REFERENCE TO RELATED APPLICATIONS

This application is a continuation of International Application No. PCT/CN2012/070317, filed on Jan. 13, 2012, which claims priority to Chinese Patent Application No. 201110006796.8, filed on Jan. 13, 2011, both of which are hereby incorporated by reference in their entities.

TECHNICAL FIELD

The present invention relates to the field of information technologies, and in particular, to a method for sending an electronic mail receipt and a mobile terminal.

BACKGROUND

A receipt of an electronic mail (Email) is used to confirm whether the electronic mail has been delivered to an intended recipient or whether the electronic mail has been read by the intended recipient.

In the prior art, an electronic mail receipt is usually sent as an electronic mail message to notify a sender. For instance, for a mobile phone user, it is increasingly popular to use applications of a mobile phone to receive electronic mails. If a sender of an electronic mail requires an electronic mail receipt from an intended recipient of the electronic mail, for the mobile phone user, frequently sending electronic mail receipts consumes network traffic of the mobile phone user.

SUMMARY OF THE INVENTION

Embodiments of the present invention provide a method for sending an electronic mail receipt and a mobile terminal, to solve the problem of network traffic consumption of a user caused by sending an electronic mail receipt from a mobile terminal, such as a mobile phone.

An embodiment of the present invention provides a method for sending an electronic mail receipt. A first mobile terminal obtains an electronic mail sent by a second mobile terminal. A header of the electronic mail contains indication information about whether it is required to send a receipt for the electronic mail. When the first mobile terminal determines according to the indication information that it is required to send a receipt, the first mobile terminal obtains a phone number of the second mobile terminal from the electronic mail and sends a short message with preset content to the phone number of the second mobile terminal.

An embodiment of the present invention further provides a mobile terminal. A receiving module is configured to obtain an electronic mail sent by another mobile terminal. A header of the electronic mail contains indication information about whether it is required to send a receipt for the electronic mail. A sending module is configured to, when the mobile terminal determines according to the indication information that it is required to send a receipt, obtain a phone number of the another mobile terminal from the electronic mail and send a short message with preset content to the phone number of the another mobile terminal.

According to the method for sending an electronic mail receipt and the mobile terminal that are provided by the embodiments of the present invention, one mobile terminal sends a receipt in the form of a short message after receiving an electronic mail sent by another mobile terminal, thereby saving network traffic for a mobile terminal user.

BRIEF DESCRIPTION OF THE DRAWINGS

To illustrate technical solutions in embodiments of the present invention or in the prior art more clearly, the accompanying drawings required for describing the embodiments are briefly described in the following. Apparently, the accompanying drawings in the following description merely show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiment of the present invention without creative efforts shall fall within the protection scope of the present invention.

Figure 1:
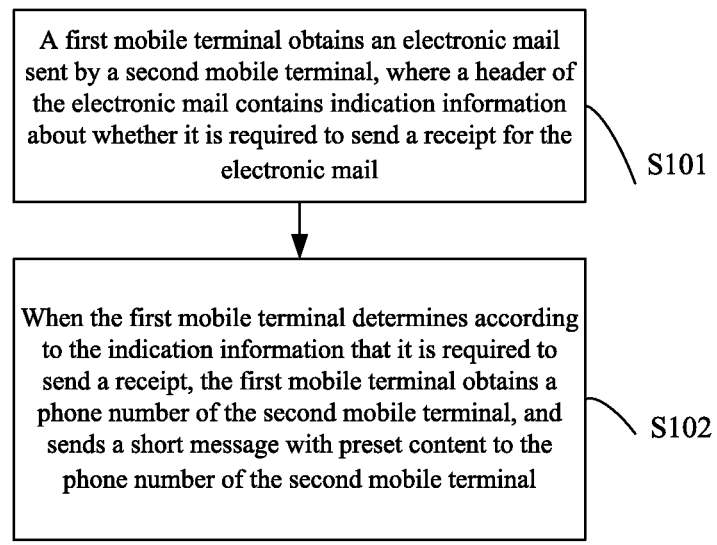
FIG. 1 is a flowchart of a first embodiment of a method for sending an electronic mail receipt according to the present invention.

FIG. 1 is a flowchart of a first embodiment of a method for sending an electronic mail receipt according to the present invention. As shown in FIG. 1, the method includes the following steps.

S101: A first mobile terminal obtains an electronic mail sent by a second mobile terminal, where a header of the electronic mail contains indication information about whether it is required to send a receipt for the electronic mail.

S102: When the first mobile terminal determines according to the indication information that it is required to send a receipt, the first mobile terminal obtains a phone number of the second mobile terminal, and sends a short message with preset content to the phone number of the second mobile terminal.

Here the first mobile terminal and the second mobile terminal may each be a mobile terminal such as a mobile phone, a personal digital assistant PDA or a portable device with a function of sending short messages. The first mobile terminal and the second mobile terminal may be mobile terminals of the same type or different types.

The header (header) of the electronic mail generally contains information about a sender, information about an intended recipient, a mail subject, and indication information about whether it is required to send a receipt. The second mobile terminal may instruct, through the header of the electronic mail, a recipient to send a receipt for the electronic mail.

The second mobile terminal may carry a phone number in the header of the electronic mail, in a mail subject or in a mail text. After receiving the electronic mail, the first mobile terminal learns from the header of the electronic mail that it is required to send a receipt, and can obtain the phone number of the second mobile terminal and send a short message with preset content to the phone number of the second mobile terminal. That is, the first mobile terminal sends a short message receipt to the second mobile terminal. The preset content may be "the electronic mail is received, thanks!"

It should be noted that, a manner of sending a receipt indicated in the header of the electronic mail sent by the second mobile terminal may be a traditional electronic mail receipt or receipts of other types, for instance, a phone call receipt or a short message receipt. Regardless of the type of the electronic mail receipt in the header of the electronic mail, the first mobile terminal may send a short message receipt with preset content to the phone number of the second mobile terminal, as long as the second mobile terminal carries the phone number in the electronic mail.

Here, the content of the short message may be preset by the first mobile terminal, and the preset content may also be edited by the first mobile terminal before being sent to the second mobile terminal.

According to the method for sending an electronic mail receipt provided by this embodiment, one mobile terminal sends a receipt in the form of a short message after receiving an electronic mail sent by another mobile terminal, thereby saving network traffic for a mobile terminal user.

On the basis of the previous embodiment, for the electronic mail sent to the first mobile terminal from the second mobile terminal, a field may be added in the header of the electronic mail to indicate whether it is required to send a receipt for the an intended recipient of the electronic mail.

Specifically, the field added in the header may only indicate whether it is required to send a receipt for the intended recipient of the electronic mail. Alternatively, another field may be added to directly indicate that the intended recipient needs to send a receipt in the form of a short message.

Here, the second mobile terminal may add a phone number in the in a subject of text of an electronic mail. However, as an exemplary implementation manner, a phone number of a second mobile terminal may be directly added in a newly added field, for instance, a number of a mobile phone or numbers of other portable devices. It should be noted that, the phone number of the mobile terminal includes but is not limited to a SIM number inside the mobile terminal, or a number implanted by an operator in the mobile terminal for wireless communication, or any other number designated in an electronic mail sent by the second mobile terminal.

Here, a newly added field may adopt the following codes to directly instruct an intended recipient to send a short message as an electronic mail receipt: X-Disposition-Notification-TO-SMS: <xxxxxxxxx>, or X-Disposition-Notification-TO-SMS: "name" <xxxxxxxxx>.

Here, "X-" means that this field is a newly added field; "TO-SMS" means a short message is required as a receipt; "name" stands for a displayed name of a sender; and <xxxxxxxxx> stands for a phone number of a second mobile terminal, which corresponds to the electronic mail receipt, for instance, a number of a mobile phone or a personal handy phone.

Furthermore, a number in the newly added field may be encrypted to guarantee the security of the phone number in the field, for instance, signing the number digitally or encrypting the number with a key.

After receiving an electronic mail, the first mobile terminal may parse a phone number of the second mobile terminal from the header and send a short message receipt.

Additionally, a field may be added in the header of the electronic mail to instruct an intended recipient to send an electronic mail receipt, or to directly instruct an intended recipient to send a short message receipt.

Furthermore, the second mobile terminal may further set a delivery report corresponding to the newly added field. The first mobile terminal may send a short message as a delivery report to notify a sender that an electronic mail has been received by a mobile terminal of the intended recipient.

Furthermore, before sending the short message with the preset content to the phone number of the second mobile terminal, the first mobile terminal may further output prompt information about whether to edit the short message with the preset content.

Specifically, the first mobile terminal may output the prompt information about whether to edit the short message with the preset content. A user may select whether to edit the short message with the preset content based on an actual requirement. After the first mobile terminal outputs a prompt about whether to edit the short message with the preset content, the first mobile terminal may exit from the prompt and send the short message with the preset content to the phone number of the second mobile terminal, if the first mobile terminal receives a NO operation from the user, or does not receive any editing operation from the user within a set time period. If the first mobile terminal receives an editing operation from the user, the first mobile terminal may store the edited short message with the preset content additionally and send the edited short message with the preset content to the phone number of the second mobile terminal. After sending the edited short message with the preset content to the phone number of the second mobile terminal, the first mobile terminal may delete the additionally edited short message with the preset content.

It should be noted that, before the first mobile terminal sends the short message with the preset content to the phone number of the second mobile terminal it is optional to output a prompt message about whether to edit a short message with preset content. With this optional step, the user may edit a reply to the short message and send the short message as an electronic mail receipt, thereby further saving network traffic of the user.

If the first mobile terminal receives an editing operation from the user, the first mobile terminal may additionally save the edited short message with the preset content and then send the edited short message with the preset content to the phone number of the second mobile terminal. Here, the additionally saved edited short message with the preset content refers to additionally saving an edited short message, so as to avoid replacing an original short message with preset content.

After the first mobile terminal sends the edited short message with the preset content to the phone number of the second mobile terminal, it is also optional to delete the additionally edited short message with the preset content. But with this step, the storage space for a mobile terminal of a user may be cleared in time.

A person of ordinary skill in the art may understand that all or part of the processes of the methods in the embodiments may be implemented by a computer program instructing relevant hardware. The program may be stored in a computer readable storage medium. When the program is run, the processes of the methods in the embodiments are performed. Here, the storage medium may be a magnetic disk, an optical disk, a read-only memory (Read-Only Memory, ROM), or a random access memory (Random Access Memory, RAM).

Figure 2:
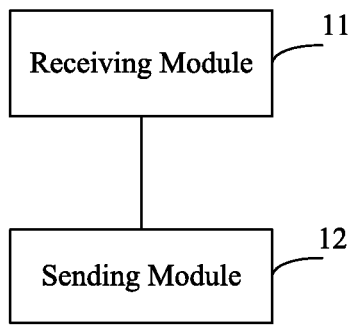
FIG. 2 is a schematic structural diagram of a first embodiment of a mobile terminal according to the present invention.

FIG. 2 is a schematic structural diagram of a first embodiment of a mobile terminal according to the present invention.

As shown in FIG. 2, the mobile terminal includes a receiving module 11 and a sending module 12. In this embodiment, the receiving module 11 is configured to obtain an electronic mail sent by another mobile terminal. A header of the electronic mail contains indication information about whether it is required to send a receipt for the electronic mail. The sending module 12 is configured to, when the mobile terminal determines according to the indication information that it is required to send a receipt, obtain a phone number of the another mobile terminal from the electronic mail and send a short message with preset content to the phone number of the another mobile terminal.

With the mobile terminal provided by this embodiment, the mobile terminal sends a receipt in the form of a short message after receiving an electronic mail sent by another mobile terminal, thereby saving network traffic for a mobile terminal user.

Figure 3:
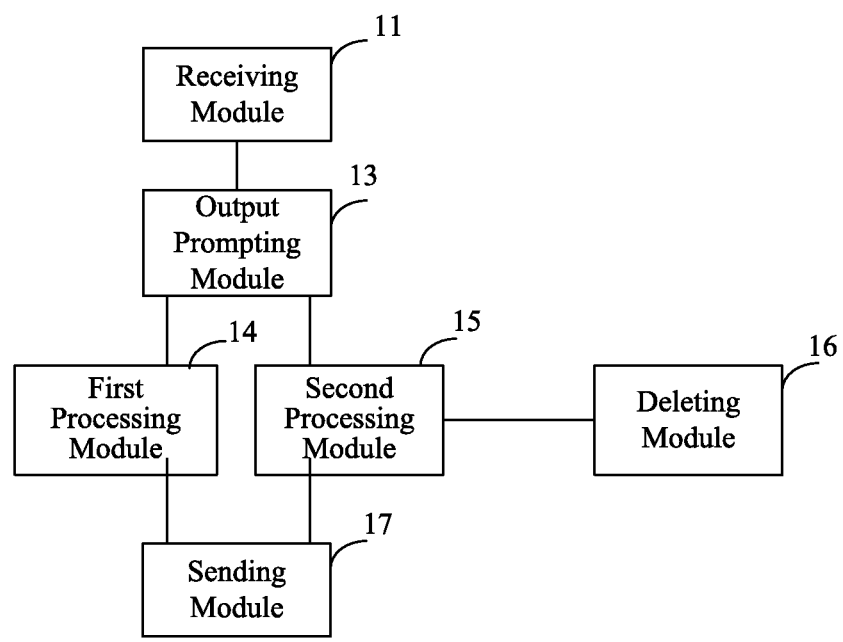
FIG. 3 is a schematic structural diagram of a second embodiment of a mobile terminal according to the present invention.

FIG. 3 is a schematic structural diagram of a second embodiment of a mobile terminal according to the present invention. As shown in FIG. 3, the mobile terminal includes a receiving module 11 and a sending module 12.

Furthermore, the terminal further includes an output prompting module 13, configured to output a prompt about whether to edit the short message with the preset content before the sending module 12 sends the short message with the preset content.

Furthermore, the mobile terminal further includes at least one of the following modules. A first processing module 14 is configured to, after the output prompting module 13 outputs the prompt about whether to edit the short message with the preset content, if a NO operation is received or no operation is received within a set time period, instruct the output prompting module 13 to stop the output and send a triggering signal to the sending module 12 to instruct the sending module 12 to send the short message with the preset content to the phone number of the another mobile terminal. A second processing module 15 is configured to, after the output prompting module 13 outputs the prompt about whether to edit the short message with the preset content, if a YES operation is received, save the edited short message with preset content additionally and send a triggering message to the sending module 12 to instruct the sending module 12 to send the edited short message with the preset content to the phone number of the another mobile terminal.

The mobile terminal further includes a deleting module 16, which is configured to delete the edited short message that is saved by the second processing module 15 additionally.

The mobile terminal provided by the embodiments of the present invention corresponds to the method for sending an electronic mail receipt provided by the embodiments of the present invention, and is a functional device for implementing the method for sending an electronic mail receipt provided by embodiments of the present invention. For the detailed process of implementing the method for sending an electronic mail, reference may be made to the method embodiments, which are not described again herein.

Finally, it should be noted that the embodiments are only provided for describing the technical solutions of the present invention, but not intended to limit the present invention. It should be understood by a person of ordinary skill in the art that although the present invention is described in detail with reference to the embodiments, modifications may be made to the technical solutions described in each of the embodiments, or equivalent replacements may be made to some technical features in the technical solutions, as long as such modifications or replacements do not cause the essence of corresponding technical solutions to depart from scope of the technical solutions in each of the embodiments of the present invention.

What is claimed is:

1. A method for sending an electronic mail receipt, the method comprising:

obtaining, by a first mobile terminal, an electronic mail sent by a second mobile terminal, wherein a header of the electronic mail contains indication information about whether the second mobile terminal requires a recipient to send a receipt for confirming the electronic mail has been received or read by the recipient; and when the first mobile terminal determines according to the indication information that the second mobile terminal requires the recipient to send a receipt for confirming the electronic mail has been received or read by the recipient, the method further comprises:

outputting a prompt about whether to edit a receipt with a preset content;

obtaining, by the first mobile terminal, a phone number of the second mobile terminal from the electronic mail and sending the receipt to the second mobile terminal according to the phone number; and deleting the receipt;

wherein if, in response to the prompt, a NO operation is received, or no operation is received within a set time period after the prompt is outputted, the prompt exits and the receipt with the preset content is sent to the second mobile terminal according to the phone number; and if a YES operation is received in response to the prompt, the receipt with the preset content is edited and saved, and the edited receipt is sent to the second mobile terminal according to the phone number.

2. The method according to claim 1, wherein a field is included in the header of the electronic mail to indicate whether the second mobile terminal requires a recipient to send a receipt for an intended recipient of the electronic mail.

3. The method according to claim 1, wherein a field is included in the header of the electronic mail to indicate a manner of sending the receipt.

4. The method according to claim 3, wherein the manner of sending the receipt comprises sending an electronic mail receipt, sending a phone call receipt or sending a short message receipt.

* * * * *